(12) United States Patent
Zhou

(10) Patent No.: US 9,034,523 B2
(45) Date of Patent: *May 19, 2015

(54) ORGANOSILICON POLYMER, SOLID ELECTROLYTE AND SOLID-STATE LITHIUM-ION BATTERY

(71) Applicant: Microvast New Materials (Huzhou) Co., Ltd., Huzhou, Zhejiang (CN)

(72) Inventor: Xiaoping Zhou, Zhejiang (CN)

(73) Assignee: Microvast Power Systems Co., Ltd., Huzhou, Zhejiang ( * ) Notice: Subject to any disclaimer, the term of this patent is extended or adjusted under 35 U.S.C. 154(b) by 0 days.

This patent is subject to a terminal disclaimer.

(21) Appl. No.: 13/709,067

(22) Filed: Dec. 10, 2012

(65) Prior Publication Data

US 2014/0072882 A1   Mar. 13, 2014

(30) Foreign Application Priority Data

Sep. 13, 2012 (CN) .......................... 2012 1 0337626

(51) Int. Cl.
*H01M 6/18* (2006.01)
*H01M 10/0565* (2010.01)
*H01M 10/052* (2010.01)

(52) U.S. Cl.
CPC ........ *H01M 10/0565* (2013.01); *H01M 10/052* (2013.01); *H01M 2300/0082* (2013.01); *Y02E 60/122* (2013.01)

(58) Field of Classification Search
USPC ....................... 429/302, 309, 313; 528/25, 31
See application file for complete search history.

(56) References Cited

U.S. PATENT DOCUMENTS

| | | | | |
|---|---|---|---|---|
| 7,378,193 | B2 * | 5/2008 | Kang et al. ..................... | 429/302 |
| 2003/0198869 | A1 * | 10/2003 | West et al. ..................... | 429/313 |
| 2008/0207849 | A1 * | 8/2008 | Yamasaki et al. ............. | 525/477 |
| 2013/0157122 | A1 * | 6/2013 | Tsai et al. ..................... | 429/189 |
| 2014/0087271 | A1 * | 3/2014 | Zhou ............................. | 429/313 |

* cited by examiner

*Primary Examiner* — Stewart Fraser
(74) *Attorney, Agent, or Firm* — Winston Hsu; Scott Margo

(57) ABSTRACT

The present disclosure discloses an organosilicon polymer, a solid electrolyte comprising the organosilicon polymer, and a corresponding solid-state lithium-ion battery. The organosilicon polymer of the present disclosure is a polymer compound comprising both an inorganic backbone-chain structure and an organic side-chain structure, and has the characteristics of both the organic polymer and the inorganic polymer as well as many unique properties. Therefore, the solid electrolyte formed by the organosilicon polymer and the solid-state lithium-ion battery thereof have many good characteristics including a good lithium-ion-conduction capability, better resistance to high temperatures, a wider range of operating temperatures, and better thermal stability.

13 Claims, 1 Drawing Sheet

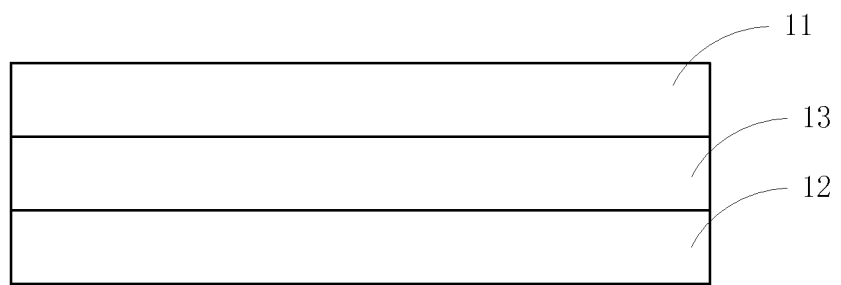

ORGANOSILICON POLYMER, SOLID ELECTROLYTE AND SOLID-STATE LITHIUM-ION BATTERY

FIELD OF THE INVENTION

The present disclosure relates to an organosilicon polymer, a solid electrolyte comprising the organosilicon polymer, preparation methods of the organosilicon polymer and the solid electrolyte, and use of the organosilicon polymer in a solid-state lithium-ion battery.

BACKGROUND OF THE INVENTION

Conventional lithium-ion secondary batteries use a liquid electrolyte solution, which mainly comprises an organic solvent and a lithium salt. When such a lithium-ion secondary battery operates at a high rate, leakage of the electrolyte solution or even combustion or explosion of the battery is likely to happen because of the high operating temperature.

The solid-state polymer electrolyte is a kind of solid electrolyte material that has experienced rapid development in recent years. Because the solid-state polymer electrolyte comprises no liquid organic solvent, the shortcomings that the battery is prone to liquid leakage and that combustion and explosion may be caused when the operating temperature is too high are overcome. According to some researches, the solid-state polymer electrolyte can further effectively suppress growth of lithium dendrites in the charging process, thereby eliminating the risk of internal short-circuit faults that may be caused due to growth of the lithium dendrites. Furthermore, the solid electrolyte has the functions of both an electrolyte solution and a separator, and this eliminates the need of using the separator and also eliminates the need of protection which would be required by a liquid-electrolyte battery in an overcharged state. Therefore, this makes the battery relatively easier to be manufactured. The polymer electrolyte has advantages such as a light weight, good tenacity and good flexibility and is easy to be formed into a thin film, so it can further increase the energy density of the lithium-ion secondary battery.

The solid-state polymer electrolytes that have been developed may be mainly classified into all solid polymer electrolytes and gel polymer electrolytes. The existing all solid electrolytes are mainly solid materials formed by lithium salts (e.g., $LiClO_4$, $LiBF_4$, $LiAsF_6$, $LiPF_6$ etc.) dissolved in polyester (e.g., PEO or PPO) or polyether having a high molecular weight; and the gel polymer electrolytes are usually formed by adding a liquid plasticizer and/or a solvent into a polymer matrix to form a stable gel structure. However, no polymer electrolyte having a relatively high ionic conductivity within a relatively wide temperature range has been found yet, so increasing the conductivity of the polymer electrolyte at the room temperature has become a hot topic of research on the solid-state polymer electrolyte.

SUMMARY OF THE INVENTION

An objective of the present disclosure is to provide an organosilicon polymer for a solid electrolyte.

The organosilicon polymer of the present disclosure comprises at least one structure unit as shown by Formula 1 or Formula 2:

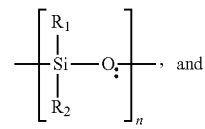

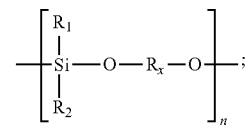

wherein $R_1$ and $R_2$ represent substituting groups which are respectively independently selected from alkyl, alkoxy, a polyether group and a terminal group with a —YA structure, at least one of the substituting groups $R_1$ and $R_2$ is the terminal group with the —YA structure, $R_x$ represents alkyl or aryl, n is an integer greater than 1, and in the terminal group with the —YA structure, Y represents an anion and A represents a cation.

According to an embodiment of the present disclosure, the anion Y is at least one selected from —O⁻, —COO⁻, —S⁻, —SO₃⁻, —N—$R_x$—O⁻, —O—$R_x$—NH⁻, —O—$R_x$—O⁻,

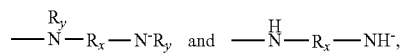

wherein $R_x$ and $R_y$ represent alkyl or aryl.

According to an embodiment of the present disclosure, the cation A is at least one selected from Li⁺, Na⁺, K⁺ and a quaternary ammonium cation, and more preferably, is Li⁺. Thus, cations and particularly lithium ions are loaded at a high concentration into the solid electrolyte comprising the organosilicon polymer, and this ensures that the material is capable of transmitting the cations and particularly the lithium ions at a large throughput.

According to an embodiment of the present disclosure, at least one of the substituting groups $R_1$ and $R_2$ is —O⁻Li⁺. More preferably, the substituting group $R_1$ is alkyl, and the substituting group $R_2$ is —O⁻Li⁺. Still more preferably, the substituting group $R_1$ is methyl, and the substituting group $R_2$ is —O⁻Li⁺.

According to an embodiment of the present disclosure, the substituting group $R_1$ or $R_2$ comprises at least one crosslinking group which is formed by a crosslinking monomer having a polymerizing function, and the crosslinking monomer is at least one selected from HO—$R_x$—OH, HO—$R_x$—NH₂, H₂N—$R_x$—NH₂,

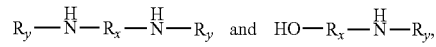

where $R_x$ and $R_y$ represent alkyl or aryl. More preferably, the crosslinking monomer is at least one selected from HO—CH₂CH₂—OH, HO—CH₂CH₂NH₂ and H₂N—CH₂CH₂—NH₂.

Another objective of the present disclosure is to provide a solid electrolyte comprising the aforesaid organosilicon polymer.

According to an embodiment of the present disclosure, the solid electrolyte comprising the organosilicon polymer may further comprise an inorganic nanoparticle which is at least one selected from $SiO_2$, $Li_4Ti_5O_{12}$, $TiO_2$, $Li_3PO_4$, $Al_2O_3$ and lithium-containing zeolite. Adding the inorganic nanoparticle into the solid electrolyte can further increase the conductivity of the solid electrolyte and, meanwhile, enhance the mechanical strength and improve the safety performance.

A further objective of the present disclosure is to provide a solid-state lithium-ion battery.

The solid-state lithium-ion battery comprises a cathode which comprises a cathode active material, an anode which comprises an anode active material, and the solid electrolyte as described above. The cathode active material may be at least one selected from lithium manganese oxide, lithium cobalt oxide, lithium nickel cobalt manganese oxide, lithium nickel cobalt aluminium oxide and lithium iron phosphate. The anode active material may be at least one selected from a carbon anode material, a lithium titanate anode material, a silicon anode material, a tin anode material and an alloy anode material. The carbon anode material is at least one selected from natural graphite, artificial graphite and mesocarbon microbeads (MCMBs).

Yet a further objective of the present disclosure is to provide a preparation method of the organosilicon polymer.

The organosilicon polymer of the present disclosure is prepared through a reaction of a silicon-containing polymeric monomer B, a polymeric monomer C and an alkoxide in a solvent. The polymeric monomer C refers to a polymeric monomer that does not comprise silicon.

According to an embodiment of the present disclosure, the organosilicon polymer is prepared under protection of an inert gas, and the inert gas is selected from nitrogen, helium and argon.

According to an embodiment of the present disclosure, the silicon-containing polymeric monomer B may be at least one selected from $LSi(OCH_2X)_3$, $L_2Si(OCH_2X)_2$ and $Si(OCH_2X)_4$, wherein X represents hydrogen (H), methyl, ethyl, propyl, butyl or phenyl, L represents methyl, ethyl, propyl, phenyl, $-N-R_x-OH$ or $-O-R_xOH$, and $R_x$ represents alkyl or aryl. More preferably, the silicon-containing polymeric monomer B is at least one selected from $LSi(OCH_3)_3$, $L_2Si(OCH_3)_2$ and $Si(OCH_3)_4$. More preferably, the silicon-containing polymeric monomer B is at least one selected from $CH_3Si(OCH_3)_3$ and $(CH_3)_2Si(OCH_3)_2$.

According to an embodiment of the present disclosure, the silicon-containing polymeric monomer B is at least one selected from $LSiCl_3$, $L_2SiCl_2$ and $SiCl_4$, where L represents methyl, ethyl, propyl, phenyl, $-N-R_x-OH$ or $-O-R_x-OH$, and $R_x$ represents alkyl or aryl. More preferably, the silicon-containing polymeric monomer B is at least one selected from $CH_3SiCl_3$ and $(CH_3)_2SiCl_2$.

According to an embodiment of the present disclosure, the silicon-containing polymeric monomer B further comprises a silicon-containing control monomer D. The silicon-containing control monomer D, which is a silicon-containing polymeric monomer for controlling the processability of the solid electrolyte material, can control the mechanical properties such as the mechanical strength and flexibility of the polymer. The silicon-containing control monomer D is a silicon-containing polymeric monomer in which one or two substituting groups on a silicon atom are alkyl, and may be at least one selected from $TSi(OCH_3)_3$ and $T_2Si(OCH_3)_2$, wherein T represents methyl, ethyl, propyl, butyl or phenyl. More preferably, the silicon-containing control monomer D is at least one selected from $CH_3Si(OCH_3)_3$ and $(CH_3)_2Si(OCH_3)_2$.

According to an embodiment of the present disclosure, the polymeric monomer C is $H_2O$, or a compound having two functional groups at both terminals of the molecule. More preferably, the polymeric monomer C is $H_2O$, or a compound having hydroxyl, amido or both of hydroxyl and amido at both terminals of a molecule thereof. According to an embodiment of the present disclosure, the polymeric monomer C is at least one selected from $H_2O$, $HO-R_x-OH$,

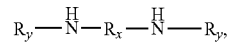

$H_2N-R_x-NH_2$, $HO-R_x-NH_2$ and

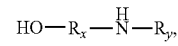

where $R_x$ and $R_y$ represent alkyl or aryl. More preferably, the polymeric monomer C is at least one selected from $HO-CH_2CH_2-OH$,

$H_2N-CH_2CH_2-NH_2$, $HO-CH_2CH_2-NH_2$ and

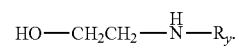

In the present disclosure, the alkoxide is a compound produced from alcohols and the cation A, and has a structure of

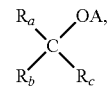

where $R_a$, $R_b$ and $R_c$ are selected from hydrogen (H), alkyl, alkylene and aryl, and A is selected from $Li^+$, $Na^+$, $K^+$ and a quaternary ammonium cation. Further, the alkoxide is at least one selected from a methoxide and an ethylate of $Li^+$, $Na^+$, $K^+$ or the quaternary ammonium cation.

According to an embodiment of the present disclosure, the solvent is at least one selected from alcohol having a structure of

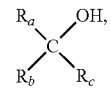

tetrahydrofuran, methyl ethyl ketone and acetone, where $R_a$, $R_b$ and $R_c$ are selected from hydrogen (H), alkyl, alkylene and aryl. More preferably, the solvent is at least one selected from methanol, ethanol, n-propanol, isopropanol, n-butanol, 2-butanol, tert-butanol, benzyl alcohol, tetrahydrofuran and acetone.

The organosilicon polymer of the present disclosure may be designed to have a chain structure, a ring structure or a reticular structure, wherein the chain structure comprises a linear structure or a branched structure. When the organosilicon polymer of the present disclosure is prepared without using a crosslinking monomer, the resulting organosilicon polymer is a chain organosilicon polymer. In the case of using a crosslinking monomer, molecular chains of the organosilicon polymer are cross-linked by the crosslinking monomer to form the reticular structure or the ring structure, thereby increasing the rigidity of the polymer.

The organosilicon polymer of the present disclosure is a polymer compound comprising both an inorganic backbone-chain structure and an organic side-chain structure, and has the characteristics of both the organic polymer and the inorganic polymer as well as many unique properties. The organosilicon polymer has anions at a high concentration therein, and has counter cations at a high concentration in the molecule, so the organosilicon polymer has a good cation-conduction (e.g., lithium-ion-conduction) capability. As compared to carbon-skeleton polymers such as polyesters or polyethers, the organosilicon polymer of the present disclosure has better thermal endurance, a wider range of operating temperatures, a better film-forming performance and better thermostability.

Therefore, the solid electrolyte and the solid-state lithium-ion battery formed by the aforesaid organosilicon polymer have, among others, a higher ionic conductivity, a higher energy density, better thermal endurance, better stability and security.

BRIEF DESCRIPTION OF THE DRAWINGS

FIGURE is a cross-sectional view of a solid-state lithium-ion battery according to an embodiment of the present disclosure.

DETAILED DESCRIPTION OF THE INVENTION

An objective of the present disclosure is to provide an organosilicon polymer for a solid electrolyte. The organosilicon polymer of the present disclosure comprises at least one structure unit as shown by Formula 1 or Formula 2:

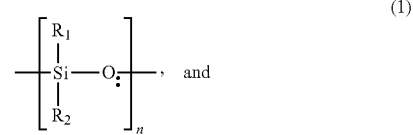

, and (1)

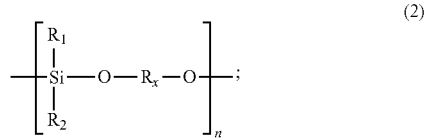

; (2)

wherein $R_1$ and $R_2$ represent substituting groups which are respectively independently selected from alkyl, alkoxy, a polyether group and a terminal group with a —YA structure, at least one of the substituting groups $R_1$ and $R_2$ is the terminal group with the —YA structure, $R_x$ represents alkyl or aryl, n is an integer greater than 1, and in the terminal group with the —YA structure, Y represents an anion and A represents a cation.

According to an embodiment of the present disclosure, the anion Y is at least one selected from —O⁻, —COO⁻, —S⁻, —SO₃⁻, —N—$R_x$—O⁻, —O—$R_x$—NH⁻, —O—$R_x$—O⁻,

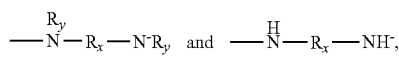

wherein $R_x$ and $R_y$ represent alkyl or aryl.

According to an embodiment of the present disclosure, the cation A is at least one selected from Li⁺, Na⁺, K⁺ and a quaternary ammonium cation, and more preferably, is Li⁺. Thus, cations and particularly lithium ions are loaded at a high concentration into the solid electrolyte comprising the organosilicon polymer, and this ensures that the material is capable of transmitting the cations and particularly the lithium ions at a large throughput.

According to an embodiment of the present disclosure, at least one of the substituting groups $R_1$ and $R_2$ is —O⁻Li⁺. More preferably, the substituting group $R_1$ is alkyl, and the substituting group $R_2$ is —O⁻Li⁺. Still more preferably, the substituting group $R_1$ is methyl, and the substituting group $R_2$ is —O⁻Li⁺.

According to an embodiment of the present disclosure, the substituting group $R_1$ or $R_2$ comprises at least one crosslinking group which is formed by a crosslinking monomer having a polymerizing function, and the crosslinking monomer is at least one selected from HO—$R_x$—OH, HO—$R_x$NH₂, H₂N—$R_x$—NH₂,

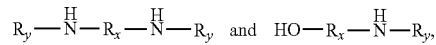

where $R_x$ and $R_y$ represent alkyl or aryl. More preferably, the crosslinking monomer is at least one selected from HO—CH₂CH₂—OH, HO—CH₂CH₂—NH₂ and H₂N—CH₂CH₂—NH₂.

Another objective of the present disclosure is to provide a solid electrolyte comprising the aforesaid organosilicon polymer.

According to an embodiment of the present disclosure, the solid electrolyte comprising the organosilicon polymer may further comprise an inorganic nanoparticle which is at least one selected from SiO₂, Li₄Ti₅O₁₂, TiO₂, Li₃PO₄, Al₂O₃ and lithium-containing zeolite. Adding the inorganic nanoparticle into the solid electrolyte can further increase the conductivity of the solid electrolyte and, meanwhile, enhance the mechanical strength and improve the safety performance.

A further objective of the present disclosure is to provide a solid-state lithium-ion battery. As shown in FIGURE, the solid-state lithium-ion battery comprises a cathode e 11 which comprises a cathode active material, an anode 12 which comprises an anode active material, and the solid electrolyte 13 as described above. The cathode active material may be at least one selected from lithium manganese oxide, lithium cobalt oxide, lithium nickel cobalt manganese oxide, lithium nickel cobalt aluminium oxide and lithium iron phosphate. The anode active material may be at least one selected from a carbon anode material, a lithium titanate anode material, a silicon anode material, a tin anode material and an alloy anode material. The carbon anode material is at least one selected from natural graphite, artificial graphite and mesocarbon microbeads (MCMBs).

Yet a further objective of the present disclosure is to provide a preparation method of the organosilicon polymer.

The organosilicon polymer of the present disclosure is prepared through a reaction of a silicon-containing polymeric monomer B, a polymeric monomer C and an alkoxide in a solvent. The polymeric monomer C refers to a polymeric monomer that does not comprise silicon.

According to an embodiment of the present disclosure, the organosilicon polymer is prepared under protection of an inert gas, and the inert gas is selected from nitrogen, helium and argon.

According to an embodiment of the present disclosure, the silicon-containing polymeric monomer B may be at least one selected from LSi(OCH$_2$X)$_3$, L$_2$Si(OCH$_2$X)$_2$ and Si(OCH$_2$X)$_4$, where X represents hydrogen (H), methyl, ethyl, propyl, butyl or phenyl, L represents methyl, ethyl, propyl, phenyl, —N—R$_x$—OH or —O—R$_x$—OH, and R$_x$ represents alkyl or aryl. More preferably, the silicon-containing polymeric monomer B is at least one selected from LSi(OCH$_3$)$_3$, L$_2$Si(OCH$_3$)$_2$ and Si(OCH$_3$)$_4$. More preferably, the silicon-containing polymeric monomer B is at least one selected from CH$_3$Si(OCH$_3$)$_3$ and (CH$_3$)$_2$Si(OCH$_3$)$_2$.

According to an embodiment of the present disclosure, the silicon-containing polymeric monomer B is at least one selected from LSiCl$_3$, L$_2$SiCl$_2$ and SiCl$_4$, where L represents methyl, ethyl, propyl, phenyl, —N—R$_x$—OH or —O—R$_x$—OH, and R$_x$ represents alkyl or aryl. More preferably, the silicon-containing polymeric monomer B is at least one selected from CH$_3$SiCl$_3$ and (CH$_3$)$_2$SiCl$_2$.

According to an embodiment of the present disclosure, the silicon-containing polymeric monomer B further comprises a silicon-containing control monomer D. The silicon-containing control monomer D, which is a silicon-containing polymeric monomer for controlling the processability of the solid electrolyte material, can control the mechanical properties such as the mechanical strength and flexibility of the polymer. The silicon-containing control monomer D is a silicon-containing polymeric monomer in which one or two substituting groups on a silicon atom are alkyl, and may be at least one selected from TSi(OCH$_3$)$_3$ and T$_2$Si(OCH$_3$)$_2$, where T represents methyl, ethyl, propyl, butyl or phenyl. More preferably, the silicon-containing control monomer D is at least one selected from CH$_3$Si(OCH$_3$)$_3$ and (CH$_3$)$_2$Si(OCH$_3$)$_2$.

According to an embodiment of the present disclosure, the polymeric monomer C is H$_2$O, or a compound having two functional groups at both terminals of the molecule. More preferably, the polymeric monomer C is H$_2$O, or a compound having hydroxyl, amido or both of hydroxyl and amido at both terminals of a molecule thereof. According to an embodiment of the present disclosure, the polymeric monomer C is at least one selected from H$_2$O, HO—R$_x$—OH,

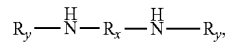

H$_2$N—R$_x$—NH$_2$, HO—R$_x$—NH$_2$ and

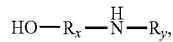

where R$_x$ and R$_y$ represent alkyl or aryl. More preferably, the polymeric monomer C is at least one selected from HO—CH$_2$CH$_2$—OH,

H$_2$N—CH$_2$CH$_2$—NH$_2$, HO—CH$_2$CH$_2$—NH$_2$ and

In the present disclosure, the alkoxide is a compound produced from alcohols and the cation A, and has the following structure:

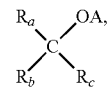

where R$_a$, R$_b$ and R$_c$ are selected from hydrogen (H), alkyl, alkylene and aryl, and A is selected from Li$^+$, Na$^+$, K$^+$ and a quaternary ammonium cation. Further, the alkoxide is at least one selected from a methoxide and an ethylate of Li$^+$, Na$^+$, K$^+$ or the quaternary ammonium cation.

According to an embodiment of the present disclosure, the solvent is at least one selected from alcohol, tetrahydrofuran, methyl ethyl ketone and acetone having a structure of

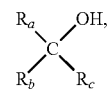

where R$_a$, R$_b$ and R$_c$ are selected from hydrogen (H), alkyl, alkylene and aryl. More preferably, the solvent is at least one selected from methanol, ethanol, n-propanol, isopropanol, n-butanol, 2-butanol, tert-butanol, benzyl alcohol, tetrahydrofuran and acetone.

The organosilicon polymer of the present disclosure may be designed to have a chain structure, a ring structure or a reticular structure, wherein the chain structure comprises a linear structure or a branched structure. When the organosilicon polymer of the present disclosure is prepared without using a crosslinking monomer, the resulting organosilicon polymer is a chain organosilicon polymer. In the case of using a crosslinking monomer, molecular chains of the organosilicon polymer are cross-linked by the crosslinking monomer to form the reticular structure or the ring structure, thereby increasing the rigidity of the polymer.

According to an embodiment of the present disclosure, a preparation method of an organosilicon polymer and a solid electrolyte using the organosilicon polymer comprises the following steps. A solvent is added into a reactor protected by nitrogen. A silicon-containing polymeric monomer LSi(OCH$_2$X)$_3$, L$_2$Si(OCH$_2$X)$_2$, Si(OCH$_2$X)$_4$, or a mixture thereof is added into the solvent; and a silicon-containing control monomer TSi(OCH$_3$)$_3$ or T$_2$Si(OCH$_3$)$_2$ is added in a certain proportion to formulate a solution. The total mol number of Si in the silicon-containing polymeric monomer and the silicon-containing control monomer that are added is m1. Then, an alkoxide of an alkali metal or an alkoxide of a quaternary ammonium cation is added into the solution, and a polymeric monomer is further added into the aforesaid solution, which is then stirred to be uniform. The total mol number of the polymeric monomer is m2, and the amount of the polymeric monomer added satisfies m2:m1=1:1~1:2. The mixed solution is stirred and heated for polymerization reaction to produce the organosilicon polymer, with the reaction temperature generally ranging between 20 degrees and 200 degrees depending on specific reactants and the reaction duration being 1 to 24 hours. After the reaction is completed, a crosslinking monomer is further added to react for another 2 to 3 hours to increase the crosslinking degree. To further adjust the performance of the electrolyte, an inorganic nanoparticle such as nano-SiO$_2$, Li$_4$Ti$_5$O$_{12}$, TiO$_2$, Al$_2$O$_3$ and/or lithium-containing zeolite is added into the organosilicon polymer. The resulted organosilicon polymer is directly used to prepare an organosilicon-polymer solid electrolyte and a solid-state lithium-ion battery.

According to an embodiment of the present disclosure, a preparation method of an organosilicon polymer and a solid electrolyte using the organosilicon polymer comprises the following steps. A solvent is added into a reactor protected by nitrogen. Then, a silicon-containing polymeric monomer $LSiCl_3$, $L_2SiCl_2$, $SiCl_4$, or a mixture thereof is added into the solvent; and a silicon-containing control monomer $TSi(OCH_3)_3$ or $T_2Si(OCH_3)_2$ is added in a certain proportion to formulate a solution. The total mol number of Si in the silicon-containing polymeric monomer and the silicon-containing control monomer that are added is m3. Next, a polymeric monomer is added into the resulting solution, which is then stirred to be uniform. The total mol number of the polymeric monomer is m4, and the amount of the polymeric monomer added satisfies m4:m3=1:1~1:2. The mixed solution is stirred and heated for polymerization reaction, with the reaction temperature generally ranging between 20 degrees and 200 degrees depending on specific reactants. During the reaction, $N_2$ is bubbled into the solution to expel the HCl produced until no HCl is detected in the exhaust gas. The reaction duration takes 1 to 24 hours. Then, an alkoxide of an alkali metal or an alkoxide of a quaternary ammonium cation is added into the solution to react for another 1 to 4 hours to produce the organosilicon polymer. After the reaction is completed, a crosslinking monomer is further added to react for 2 to 3 hours to increase the crosslinking degree. To further adjust the performance of the electrolyte, an inorganic nanoparticle such as nano-$SiO_2$, $Li_4Ti_5O_{12}$, $TiO_2$, $Al_2O_3$ and/or lithium-containing zeolite is added into the organosilicon polymer. The resulted organosilicon polymer is directly used to prepare an organosilicon-polymer solid electrolyte and a solid-state lithium-ion battery.

Example 1

Preparation of lithium methoxide: 0.200 mol of lithium metal was added into 200 ml of methanol to react completely to produce a lithium methoxide solution.

Synthesis of an organosilicon-polymer solid electrolyte: 100 ml of methanol was added into a stirred tank reactor as a solvent. 0.150 mol of $CH_3Si(OCH_3)_3$ and 0.050 mol of $(CH_3)_2Si(OCH_3)_2$ were added into the reactor. 0.010 mol of $(CH_3CH_2)_2Si(OCH_3)_2$ was added as a silicon control monomer, and then the methanol solution of the lithium methoxide was added. Then, 0.300 mol of $H_2O$ was added into the reactor while being stirred. The mixed solution was stirred and heated to 80° C., and the reaction proceeded for 4 hours at this temperature to produce an organosilicon polymer. The organosilicon polymer was used to directly prepare an organosilicon-polymer solid electrolyte.

Example 2

Preparation of lithium methoxide: 0.200 mol of lithium metal was added into 200 ml of methanol to react completely to produce a lithium methoxide solution.

Synthesis of an organosilicon-polymer solid electrolyte: 100 ml of methanol was added into a stirred tank reactor as a solvent. 0.150 mol of $CH_3Si(OCH_3)_3$ and 0.050 mol of $(CH_3)_2Si(OCH_3)_2$ were added into the reactor. 0.020 mol of $CH_3CH_2Si(OCH_3)_3$ was added as a silicon control monomer, and then the methanol solution of the lithium methoxide was added. Then, 0.300 mol of $H_2O$ was added into the reactor while being stirred. The mixed solution was stirred and heated to 80° C., and the reaction proceeded for 4 hours at this temperature. Then, 0.010 mol of glycol was added as a crosslinking agent, and the reaction continued for 2 hours at 80° C. to produce an organosilicon polymer. The organosilicon polymer was used to directly prepare an organosilicon-polymer solid electrolyte.

Example 3

Preparation of lithium methoxide: 0.200 mol of lithium metal was added into 200 ml of methanol to react completely to produce a lithium methoxide solution.

Synthesis of an organosilicon-polymer solid electrolyte: 100 ml of methanol was added into a stirred tank reactor as a solvent. 0.150 mol of $CH_3Si(OCH_3)_3$ and 0.050 mol of $(CH_3)_2Si(OCH_3)_2$ were weighed and added into the reactor. 0.010 mol of $(CH_3CH_2)_2Si(OCH_3)_2$ was added as a silicon control monomer, and then the methanol solution of the lithium methoxide was added. Then, 0.300 mol of $H_2O$ was added into the reactor while being stirred. The mixed solution was stirred and heated to 50° C., and the reaction proceeded for 4 hours at this temperature to produce an organosilicon polymer. Then, 0.020 mol of nano-$Li_4Ti_5O_{12}$ (less than 100 nanometers) was added, and a sand milling process was carried out for 2 hours at the room temperature to obtain the organosilicon-polymer solid electrolyte.

Example 4

Preparation of lithium methoxide: 0.200 mol of lithium metal was added into 200 ml of methanol to react completely to produce a lithium methoxide solution.

Synthesis of an organosilicon-polymer solid electrolyte: 100 ml of methanol was added into a stirred tank reactor as a solvent. 0.150 mol of $CH_3Si(OCH_3)_3$ and 0.050 mol of $(CH_3)_2Si(OCH_3)_2$ were added into the reactor. Then, the methanol solution of the lithium methoxide was added. Then, 0.300 mol of

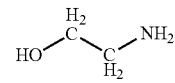

was added into the reactor while being stirred. The mixed solution was stirred and heated to 80° C., and the reaction proceeded for 4 hours at this temperature to produce an organosilicon polymer. The organosilicon polymer was used to directly prepare the organosilicon-polymer solid electrolyte.

Example 5

Preparation of lithium methoxide: 0.200 mol of lithium metal was added into 200 ml of methanol to react completely to produce a lithium methoxide solution.

Synthesis of an organosilicon-polymer solid electrolyte: $N_2$ was fed into a stirred tank reactor for the protection purpose, and 250 ml of methanol was added into the reactor as a solvent. 0.150 mol of $CH_3SiCl_3$ and 0.050 mol of $(CH_3)_2SiCl_2$ were weighed and added into the reactor. Next, 0.300 mol of

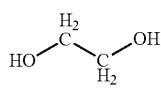

was added into the aforesaid solution, which was then stirred to be uniform. $N_2$ was bubbled into the solution to expel the HCl produced, and the solution was stirred and heated to 50° C. to continue the reaction until no HCl was detected in the exhaust gas. Then, the methanol solution of the lithium methoxide was added, and the resulting solution was stirred at 50° C. to react for 2 hours to produce an organosilicon polymer. The organosilicon polymer was used to directly prepare the organosilicon-polymer solid electrolyte.

Example 6

Preparation of lithium methoxide: 0.200 mol of lithium metal was added into 200 ml of methanol to react completely to produce a lithium methoxide solution.

Synthesis of an organosilicon-polymer solid electrolyte: $N_2$ was fed into a stirred tank reactor for the protection purpose, and 250 ml of methanol was added into the reactor as a solvent. 0.150 mol of $CH_3SiCl_3$ and 0.050 mol of $(CH_3)_2SiCl_2$ were weighed and added into the reactor. Next, 0.300 mol of

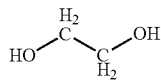

was added into the aforesaid solution, which was then stirred to be uniform. $N_2$ was bubbled into the solution to expel the HCl produced, and the solution was stirred and heated to 50° C. to continue the reaction until no HCl was detected in the exhaust gas. Then, the methanol solution of the lithium methoxide was added, and the resulting solution was stirred at 50° C. to react for 2 hours. Then, 0.030 mol of nano-$Li_4Ti_5O_{12}$ (less than 100 nanometers) was added, and a sand milling process was carried out for 2 hours at the room temperature to obtain an organosilicon polymer. The organosilicon polymer was used to directly prepare the organosilicon-polymer solid electrolyte.

What is claimed is:

1. A preparation method of an organosilicon polymer for a solid electrolyte, wherein the organosilicon polymer comprising at least one structure unit as shown by Formula 1 or Formula 2:

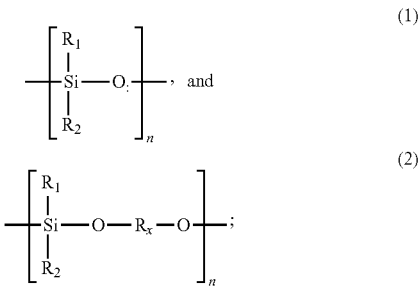

wherein R1 and R2 represent substituting groups which are respectively independently selected from alkyl, alkoxy, a polyether group and a terminal group with a —YA structure, at least one of the substituting groups R1 and R2 is the terminal group with the —YA structure, Rx represents alkyl or aryl, n is an integer greater than 1, and in the terminal group with the —YA structure, Y represents an anion and A represents a cation;

wherein the organosilicon polymer is prepared through a reaction of a silicon-containing polymeric monomer B, a polymeric monomer C and an alkoxide in a solvent.

2. The preparation method of the organosilicon polymer of claim 1, wherein the silicon-containing polymeric monomer B is at least one selected from $LSi(OCH_2X)_3$, $L_2Si(OCH_2X)_2$ and $Si(OCH_2X)_4$, where X represents hydrogen (H), methyl, ethyl, propyl, butyl or phenyl, L represents methyl, ethyl, propyl, phenyl, —N—$R_x$—OH or —O—$R_x$—OH, and Rx represents alkyl or aryl.

3. The preparation method of the organosilicon polymer of claim 2, wherein the silicon-containing polymeric monomer B is at least one selected from $LSi(OCH_3)_3$, $L_2Si(OCH_3)_2$ and $Si(OCH_3)_4$.

4. The preparation method of the organosilicon polymer of claim 3, wherein the silicon-containing polymeric monomer B is at least one selected from $CH_3Si(OCH_3)_3$ and $(CH_3)_2Si(OCH_3)_2$.

5. The preparation method of the organosilicon polymer of claim 1, wherein the silicon-containing polymeric monomer B is at least one selected from $LSiCl_3$, $L_2SiCl_2$ and $SiCl_4$, where L represents methyl, ethyl, propyl, phenyl, —N—$R_x$—OH or —O—$R_x$—OH, and Rx represents alkyl or aryl.

6. The preparation method of the organosilicon polymer of claim 5, wherein the silicon-containing polymeric monomer B is at least one selected from $CH_3SiCl_3$ and $(CH_3)_2SiCl_2$.

7. The preparation method of the organosilicon polymer of claim 1, wherein the silicon-containing polymeric monomer B further comprises a silicon-containing control monomer D which is at least one selected from $TSi(OCH_3)_3$ and $T_2Si(OCH_3)_2$, where T represents methyl, ethyl, propyl, butyl or phenyl.

8. The preparation method of the organosilicon polymer of claim 7, wherein the silicon-containing control monomer D is at least one selected from $CH_3Si(OCH_3)_3$ and $(CH_3)_2Si(OCH_3)_2$.

9. The preparation method of the organosilicon polymer of claim 1, wherein the polymeric monomer C is $H_2O$, or a compound having hydroxyl groups, amido groups, or both of hydroxyl and amido groups at both terminals of a molecule thereof.

10. The preparation method of the organosilicon polymer of claim 9, wherein the polymeric monomer C is at least one selected from $H_2O$, HO—$R_x$—OH,

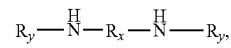

$H_2N$—$R_x$—$NH_2$, HO—$R_x$—$NH_2$ and

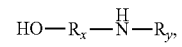

where Rx and Ry represent alkyl or aryl.

11. The preparation method of the organosilicon polymer of claim 10, wherein the polymeric monomer C is at least one selected from HO—$CH_2CH_2$—OH,

$H_2N-CH_2CH_2-NH_2$, $HO-CH_2CH_2-NH_2$ and

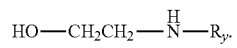

12. The preparation method of the organosilicon polymer of claim 1, wherein the alkoxide has the following structure:

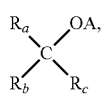

where Ra, Rb and Rc are selected from hydrogen (H), alkyl, alkylene and aryl, and A is selected from Li+, Na+, K+ and a quaternary ammonium cation.

13. The preparation method of the organosilicon polymer of claim 12, wherein the alkoxide is at least one selected from a methoxide and an ethylate of Li+, Na+, K+ or the quaternary ammonium cation.

* * * * *